Dec. 6, 1966 G. H. TAUSCH 3,289,479
DIFFERENTIAL PRESSURE SENSING TRANSDUCER
Filed Oct. 5, 1964
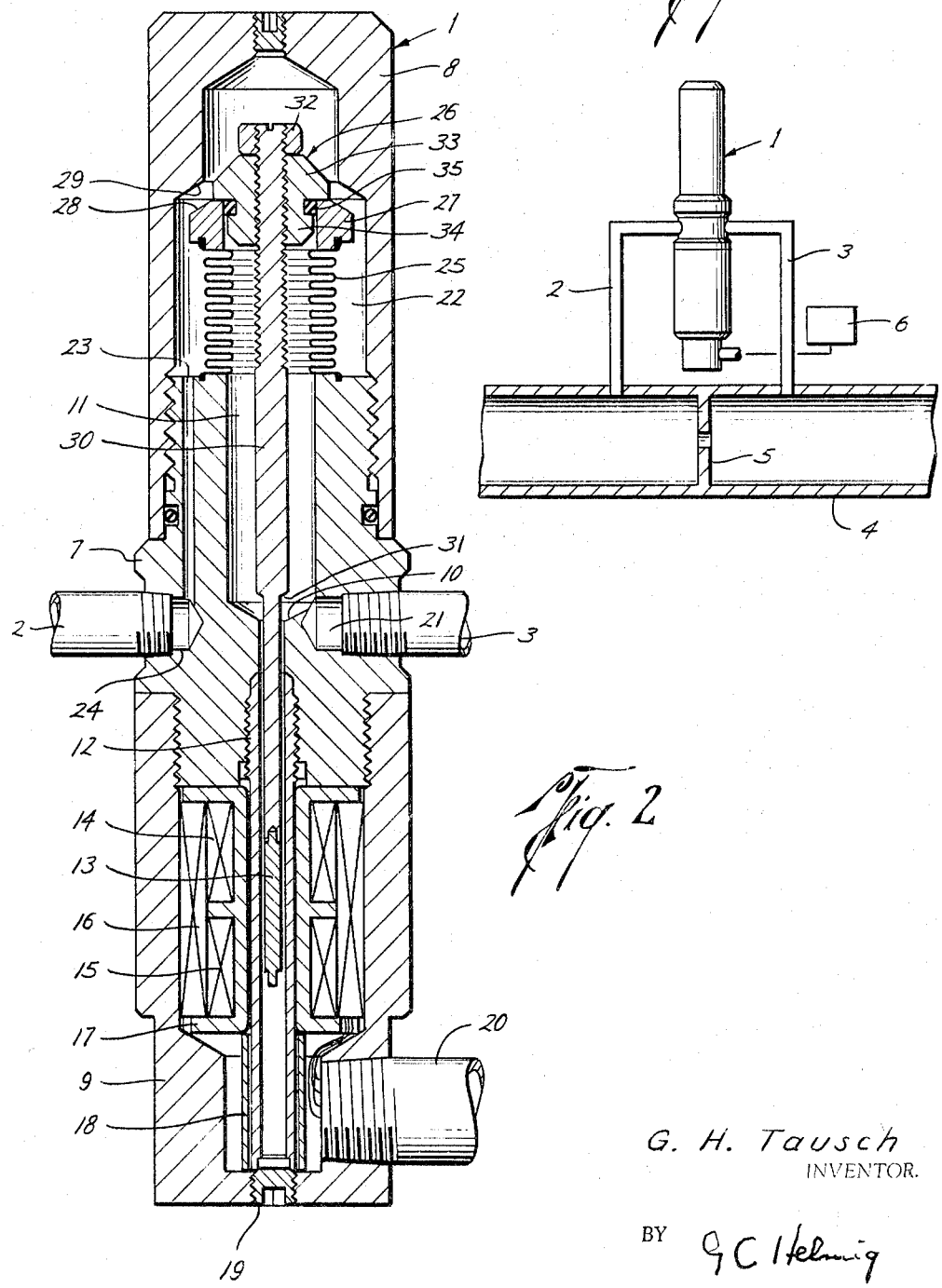
G. H. Tausch
INVENTOR.
BY GC Helmig
ATTORNEY

United States Patent Office 3,289,479
Patented Dec. 6, 1966

3,289,479
DIFFERENTIAL PRESSURE SENSING
TRANSDUCER
Gilbert H. Tausch, Houston, Tex., assignor to Camco, Incorporated, Houston, Tex., a corporation of Texas
Filed Oct. 5, 1964, Ser. No. 401,303
9 Claims. (Cl. 73—407)

This invention relates to fluid pressure differential transducers and particularly to a pressure sensing device having a flexible wall exposed on opposite sides to differential pressures and provided with a double-acting relief valve which responds to abnormally wide spreads in pressure differentials and opens a path for flow in either direction across the wall for reducing to a selected extent the difference in opposing pressures acting on the flexible wall whereby to preserve the wall against damage from excessive stress.

Fluid flowing through a conduit is often measured by gauging and comparing relative pressures immediately ahead and beyond a flow orifice of a predetermined size in relation to flow conditions. Conveniently, the pressure fluids from upstream and downstream sides of the orifice restriction can be brought into opposing relation on opposite sides of a movable wall whose responsive travel position, indicative of pressure differential, is recorded and interpreted in terms of flow rate.

The present invention aims to provide an improved pressure differential transformer in which the deformation of a separating partition between opposing fluids and in response to their differing pressures, controls action of a differential transformer in the generation of voltage fed to a recording computer mechanism. As the deformable partition component, there is utilized a compressible bellows of thin-wall spring metal ideally suited for the purpose and which will have a long life of carefree service under usual and normal pressure conditions. To protect and save the bellows from harmful strain incident to expected but generally infrequent imposition of abnormally high pressure differentials is one of the primary objects hereof.

Another object is to partition pressure charged chambers within a hollow housing by means of a compressible bellows having one end secured and sealed to the housing with its opposite end free for to and fro axial movement and valved by a seating ring on the free end together with a co-operating closure plug for the ring aperture and which ring and plug are separably engageable on one another in aperture closing relation throughout a given range of bellows contraction and extension but are separable beyond such range to open communication between the exterior and the interior of the bellows.

A further object of the invention is to provide a peripherally shouldered closure plug constituted by a head portion to overlie and bear on a lateral valving surface of the seating ring within the pressure chamber that surrounds the bellows and is for connection with the upstream and ordinary high pressure side of the conduit flow orifice and by a neck portion which, except for a desirable sliding seal fit with the cylindrical interior of the seating ring and immediate the head, projects as a centering guide into the ring with an annular clearance of predetermined size so that when the closure between the ring and head is broken, there is provided a flow path communicating the two chambers separated by the bellows and which path is somewhat greater in area than that of a choked entrance passage leading into the nominally high pressure chamber and serving as a retardant against rapid pressure fluctuation therebeyond such as could cause flutter and undue fatigue of the bellows wall.

Additional objects and advantages will become apparent from an inspection of the accompanying drawing wherein—

FIG. 1 is a diagrammatic view of a system installation showing a pipe line in section and the improved transducer in elevation; and FIG. 2 is a vertical enlarged section of the transducer parts in transformer null position.

In the drawing, FIG. 1 is illustrative of a system installation embodying the improved pressure differential transducer assembly as contained within a housing 1 having pipe connections 2 and 3 with a fluid conduit or pipe line 4 on the upstream and downstream sides respectively of an orifice plate 5, and as having signal transmitting connection with a computer 6 for recordation of pipe flow as reflected by pressure differentials on opposite sides of the orifice plate 5. Usually, the dominant pressure is upstream of the orifice but whatever the occurrence, it is to be recorded.

The housing 1 is generally hollow and when disposed on a vertical longitudinal axis, it is made up of a tubular body 7 whose upper and lower ends are screw threaded into a top dome or cap 8 and a bottom dome or cap 9. The axial opening through the center of the tubular body 6 has an intermediate upwardly facing shoulder 10 between an upper and relatively large diameter chamber 11 and a downwardly projected smaller bore wherein there is secured, as by screw threads, a dependent tube 12 of nonmagnetic material such as stainless steel.

A differential transformer is contained within the bottom cap 9 and comprises an armature or ferrite rod core 13 inside the nonmagnetic tube 12 and a coil assembly made up of a pair of end to end secondary coils 14 and 15 surrounded by a primary coil 16 with the coils being mounted on a spool or bobbin 17 held upwardly against the bottom of the body 7 by a spacer tube 18 between the spool and the end wall of the bottom cup 9. This end wall has a centrally positioned drain opening normally closed by a plug 19. Current conducting wires for the coils pass through a mounting tube 20 threaded into a lateral port in the thickened wall of the cup 9 and below the spool 17.

A portion of the low pressure pipe 3 is shown in FIG. 2 as threaded into a tap opening 21 extending through one side of the body 7 and into the central chamber space 11. This interior chamber space is separated by means of a flexible partition unit from the chamber space 22 within the upper dome 8 and the chamber space 22 communicates through a longitudinal bore 23 through the body 7 and with a lateral drilled and tapped opening 24 for connection with the high pressure pipe 2. The size of the bore 23 is predetermined to serve as a flow choke and minimize the effect within the chamber 22 of rapid pressure changes within the pipe line.

The chamber partitioning unit is a compressible spring metal tubular bellows 25 and an upper end closure plug 26 having separable engagement with a seating ring 27 carried by the top of the bellows. The spring bellows is secured at its lower end on the body 7 and its interior is a continuation of the low pressure chamber 11. Bellows contraction or distention results in downward travel or upward travel of its free end or seating ring 27 and of the closure plug 26 under normal pressure conditions. The upper face of the seating ring 27 is shown as having a flat surface area near its central aperture and an outwardly and downwardly inclined surface 28 outwardly of the rim of the closure plug 26. This surface 28 can on extreme bellows distention come into engagement with a downwardly facing shoulder 29 on the top dome 8 as a limit stop to bellows distention. The above mentioned flat surface area on the ring upper side is overlaid by a downward surface at the rim of the closure plug 26 and these two surfaces preferably are ground true in planes normal to the longitudinal axis for tight contact throughout their circular areas.

The closure plug 26 includes a dependent stem 30 of stainless steel connected at its lower end with the ferrite armature 13 and transmits motion to the armature with change in position of the closure 26. Intermediate the length of the stem 30 and spaced from the body shoulder 10 a given distance from null position of the armature is a downwardly facing shoulder 31 on the stem whose contact abutment with the shoulder 10 establishes a limit bellows contraction. In its upper portion, the stem 30 is adjustably screw threaded through the closure plug 26 and the screw threads are precoated with a liquid plastic such as that marketed under the trade name Grade "H" Loctite. Such plastic material will set up in the absence of air and form a reliable seal between the threaded parts. A lock nut, shown at 32 on the terminal threads of the stem, can be turned down against the closure plug 26 for maintaining preadjustment of the length of the stem 30 and thereby the position of the ferrite armature 13. Such adjustment is made in the final assembly of the parts and prior to application of the top dome 8. With pressures equalized on opposite sides of the bellows, a screw driver can be fitted to a transverse slot at the tip of the stem 30 setting the armature 13 at null position.

The closure plug 26 as shown is formed with an upper head portion 33 positioned within the high pressure chamber 22 and having a downwardly extending neck portion 34 fitted within the aperture of the ring 27. Immediately below the head, an annular groove in the neck portion is provided for locating an O-ring seal 35 to engage the internal cylindrical surface of the seating ring 27 when the head is in bearing engagement with the seating ring. Below the O-ring 35, the outside diameter of the neck 34 is less than the inside diameter of the cylindrical opening through the seating ring 27 and the circular clearance area is designed to be slightly greater than the flow area through the choke inlet passage 23. Consequently, if the ring 27 and the head 33 are separated to an extent to break the valving seal therebetween at a time when pressure internally of the bellows is less than external chamber pressure, the escape of fluid through the annular clearance path will be at a rate faster than the rate of incoming pressure fluid to insure bleed-down from the chamber 22.

When the transducer is installed as seen in FIG. 1, the pressures within and outside the bellows will act in opposition to one another, and if the pressures are equal, the differential transformer will provide a reading to indicate that the armature 13 is at null position. The armature will move downwardly from null position with collapse of the bellows to an extent which indicates how much the upstream pressure exceeds downstream pressure in relation to the orifice plate 5 in the pipe line. Upward travel of the armature 13 will be in accord with how much upstream pressure is below downstream pressure. Generally, upstream pressure will be dominant and should the differential become too wide so as to depress the parts to an extent to take up the clearance between the abutment shoulders 31 and 10, the movement of the head 33 will be stopped and allow the further contraction of the bellows and the descent of the seating ring 27 for opening the valve so as to relieve excessive pressure conditions exteriorly of the bellows. In a commercial embodiment, such blowoff is arranged to occur at a pressure differential of approximately twenty-seven pounds per square inch. On the other hand, should the internal bellows pressure exceed outside pressure by as much as ten pounds per square inch, the weight and frictional engagement of the head 33 on the seating ring 27 will be overcome and the head will tend to pop out of the ring for opening the communicating passage between the internal and external chambers 11 and 22. Experience indicates that such pop-out is likely to occur prior to the time bellows distention is great enough to bring the upwardly facing seating surface 28 against the abutment 29 on the housing, but such surfaces are provided as a safety factor and particularly in the event of a very sudden drop in pressure within the external chamber 22. Ordinarily, also, the rise of the head 33 above the seat ring 27 will not carry the neck 34 out of the ring aperture but should the neck leave the aperture, it will immediately drop back into place automatically once the normal pressure relationships are re-established. To facilitate re-entry of the neck, its lower peripheral corner is preferably beveled so as to taper downwardly, as shown in the drawing.

The pressure values indicated under which the valve passageway opens are by way of example only and not by way of limitation. It is to be understood that while the detail structure has been specifically described and illustrated, various modifications can be made as come within the scope of the appended claims.

What is claimed is:

1. In a pressure differential transducer assembly, a hollow housing, a coil mounted within the housing and an armature for the coil, partitioning means dividing the interior of the housing into two pressure fluid chambers and comprising a flexible wall sealed and secured at one end to the housing and a closure member arranged for travel to and from seating engagement on the free end of the flexible wall, said partitioning means being movable in response to differential fluid pressures on opposite sides of the flexible wall, a motion transmitting connection joining the closure member to said armature, means limiting the range of movement of the closure member in one direction and enabling the free end of the flexible wall to be unseated for opening the chambers one to another when the closure member has reached its movement limit in said one direction, said free end of the flexible wall having a limited range of movement in the other direction so that the closure member will unseat itself in response to a given movement of the closure member in the other direction.

2. A differential pressure transducer including a pair of relatively movable members of which one member is coil means and the other member is an armature for the coil means, a chambered housing having fixed relation with one of said members, a flexible wall enclosed by and secured at one portion thereof to the housing, a seating element carried by another portion of the flexible wall for movement upon flexure of the wall, a closure disengageably seated on said seating element to close communication between opposite sides of the flexible wall, the seating disengagement of the closure serving to open such communication, means for connecting the chambered housing on one side of the flexible wall with a pressure fluid source and other means for connecting the chambered housing on the other side of the flexible wall with another pressure fluid source, said closure and said seating element being movable in one direction under dominating pressure on one side of the flexible wall and in the other direction under dominating pressure on the other side of the flexible wall, a motion transmitting connection joining said closure with one of said members, abutment means on the housing engageable by the closure upon a given range of closure travel in one direction and while the seating element moves away from the closure for pressure equalization on opposite sides of the flexible wall, said flexible wall in relation to the chambered housing being arranged to limit the extent of wall flexure and movement of the seating element in the other direction while the closure member disengages itself under fluid pressure thereon.

3. In a differential pressure transducer, a differential transformer having relatively movable coil means and armature means, a housing having fixed relation with one of said means and enclosing a pair of chambers for reception of pressure fluid, a movable partition separating said chambers and responsive to relative fluid pressures within the chambers, said partition including a flexible bellows secured at one end to the housing, a valve seating ring on the free end of the bellows and a valve member having motion transmitting connection with the other of said means and seating engagement with said ring for movement therewith throughout a given range of bellows flexure, said sealing ring being movable away from the valve member beyond one end of said given range and said valve member being movable away from the seating ring beyond the opposite end of said given range.

4. In a differential pressure transducer, a differential transformer having coil means and an armature movable relative to the coil means, a housing containing fluid pressure chambers and positioned fixedly relative to the coil means, a movable partition separating said chambers and responsive to relative chamber pressures, said partition comprising a flexible wall having one portion fixed in the housing and a valve seating ring portion spaced from and free to move back and forth relative to the fixed portion, a closure valve having motion transmitting connection with the armature and engaging said seating ring for movement therewith within a given range of flexure of said flexible wall, said housing and the components of the partition being constructed and arranged for disengagement of the seating ring from the valve on seating ring movement beyond one end of said given range and for disengagement of said valve from the seating ring upon valve movement beyond the other end of said given range.

5. In a differential pressure transducer as in claim 4, said flexible wall comprising an axially extending bellows and said closure valve comprising a head engageable with the outer face of the seating ring, a neck projected inwardly from the head to fit within the seating ring with a slide fit therewith when said head is engaged with the ring together with a stem carried by the head and projected through the bellows as the motion transmitting connection with said armature, said stem and the housing having co-operating surfaces for abutment one with another upon given head travel in the bellows collapsing direction.

6. In a differential pressure transducer as in claim 5 together with co-operating surfaces on the housing and said seating ring for stop abutment one with another upon given ring travel in the bellows distending direction.

7. In a differential pressure transducer as in claim 4, said flexible wall comprising an axially extending bellows and said closure valve comprising a head engageable with the outer face of said ring together with a stem projected through the bellows from the head and connected with the armature, and stem length adjustment means accessible exteriorly of the bellows for setting null position of the armature to fit head position when the bellows is free of fluid pressure differential stress.

8. In a differential pressure transducer as in claim 7, wherein said stem length adjustment means is a screw threaded connection between the stem and the head and the threads are precoated with a plastic sealing material.

9. In a differential pressure transducer as in claim 4, wherein an axially collapsible-extensible bellows constitutes said flexible wall and the housing enclosed chamber exteriorly of the bellows normally is for fluid pressure which is higher than the fluid pressure interiorly of the bellows, said chamber exteriorly of the bellows having a chocked pressure fluid entry port of predetermined size, said closure valve comprising a head located within the last mentioned chamber to seat against a lateral face on the seating ring and a neck projected from the head and within said ring with annular clearance slightly in excess of the size of said entry port for the flow of pressure fluid through such clearance when the valve head is unseated and at a rate in excess of pressure fluid flow through the choked entry port.

References Cited by the Examiner
UNITED STATES PATENTS 2,489,123  11/1949  Dickey _____ 73—410

LOUIS R. PRINCE, *Primary Examiner.*